US012525762B2

(12) United States Patent
Payne et al.

(10) Patent No.: US 12,525,762 B2
(45) Date of Patent: *Jan. 13, 2026

(54) LASER GAIN MEDIA FABRICATED VIA DIRECT INK WRITING (DIW) AND CERAMIC PROCESSING

(71) Applicant: Lawrence Livermore National Security, LLC, Livermore, CA (US)

(72) Inventors: Stephen A. Payne, Castro Valley, CA (US); Nerine J. Cherepy, Piedmont, CA (US); Eric B. Duoss, Dublin, CA (US); Ivy Krystal Jones, Chicago, IL (US); Zachary M. Seeley, Livermore, CA (US); Cheng Zhu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,965

(22) Filed: Apr. 1, 2024

(65) Prior Publication Data
US 2024/0250491 A1 Jul. 25, 2024

Related U.S. Application Data

(60) Division of application No. 17/027,526, filed on Sep. 21, 2020, now Pat. No. 12,166,328, which is a (Continued)

(51) Int. Cl.
*H01S 3/06* (2006.01)
*H01S 3/091* (2006.01)
(Continued)

(52) U.S. Cl.
CPC .......... *H01S 3/0617* (2013.01); *H01S 3/0912* (2013.01); *H01S 3/0941* (2013.01); *H01S 3/113* (2013.01); *H01S 3/1643* (2013.01)

(58) Field of Classification Search
CPC .... H01S 3/0617; H01S 3/0912; H01S 3/0941; H01S 3/113; H01S 3/1643; H01S 3/0612; H01S 3/08045; H01S 3/1611; G01B 11/06
See application file for complete search history.

(56) References Cited

U.S. PATENT DOCUMENTS

| 4,545,646 A | 10/1985 | Chern et al. |
| 4,925,259 A | 5/1990 | Emmett |

(Continued)

FOREIGN PATENT DOCUMENTS

WO WO-2010048529 A2 * 4/2010 ......... C04B 35/6269

OTHER PUBLICATIONS

International Search Report and Written Opinion from PCT Application No. PCT/US2017/037876, dated Oct. 12, 2017.
(Continued)

*Primary Examiner* — Doris L Lee
(74) *Attorney, Agent, or Firm* — Zilka Kotab, P.C.

(57) ABSTRACT

In one aspect, a transparent ceramic optic includes: a lasing region comprising at least one lasing species dopant; and a transparent region transparent to light generated by the lasing species. At least the transparent region is doped with at least one other dopant species such that the lasing region and the transparent region are characterized by a difference in refractive index between the two regions in an amount of about $1.0 \times 10^{-4}$ or less.

20 Claims, 6 Drawing Sheets

Related U.S. Application Data continuation of application No. 16/306,865, filed as application No. PCT/US2017/037876 on Jun. 16, 2017, now Pat. No. 10,840,668.

(60) Provisional application No. 62/351,866, filed on Jun. 17, 2016.

(51) Int. Cl.
  *H01S 3/0941* (2006.01)
  *H01S 3/113* (2006.01)
  *H01S 3/16* (2006.01)

(56) References Cited

U.S. PATENT DOCUMENTS

| | | | |
|---|---|---|---|
| 5,000,575 | A | 3/1991 | Southwell et al. |
| 6,297,179 | B1 | 10/2001 | Beall et al. |
| 10,840,668 | B2 | 11/2020 | Payne et al. |
| 12,166,328 | B2 | 12/2024 | Payne et al. |
| 2003/0180451 | A1 | 9/2003 | Kodas et al. |
| 2005/0104265 | A1 | 5/2005 | Tanaka et al. |
| 2007/0280317 | A1* | 12/2007 | Kouta ............ H01S 3/061 372/39 |
| 2008/0151358 | A1 | 6/2008 | Jiang et al. |
| 2008/0245266 | A1 | 10/2008 | Lewis et al. |
| 2010/0096596 | A1 | 4/2010 | Lewis et al. |
| 2011/0024668 | A1 | 2/2011 | Chung et al. |
| 2011/0100548 | A1 | 5/2011 | Shaw et al. |
| 2013/0044779 | A1 | 2/2013 | Byren |
| 2019/0348809 | A1 | 11/2019 | Payne et al. |
| 2021/0098957 | A1 | 4/2021 | Payne et al. |

OTHER PUBLICATIONS

Seeley et al., "Expanded phase stability of Gd-based garnet transparent ceramic scintillators," Journal of Materials Research, vol. 29, No. 19, Oct. 14, 2014, pp. 2332-2337.

Ober et al., "Active mixing of complex fluids at the microscale," PNAS, vol. 112, No. 40, Oct. 6, 2015, pp. 12293-12298.

Zelmon et al., "Optical properties of Nd-doped ceramic yttrium aluminum garnet," Proceedings of SPIE, The International Society for Optical Engineering, Jan. 2004, pp. 255-264.

Dong et al., "Cr, Nd:YAG self-Q-switched laser with high efficiency output," Optics & Laser Technology, vol. 34, 2002, pp. 589-594.

Ikesue et al., "Fabrication and Optical Properties of High-Performance Polycrystalline Nd:YAG Ceramics for Solid-State Lasers," Journal of the American Ceramic Society, vol. 78, No. 4, 1995, pp. 1033-1040.

Cornock et al., "Coaxial additive manufacture of biomaterial composite scaffolds for tissue engineering," IOP Publishing, Biofabrication, vol. 6, 2014, 10 pages.

Lorang et al., "Photocurable Liquid Core-Fugitive Shell Printing of Optical Waveguides," Advanced Materials, vol. 23, 2011, pp. 5055-5058.

Cheng et al., "Thermal analysis on grad-doped active-mirror Yb:YAG ceramic lasers," Optical Engineering, vol. 54, Nov. 2015, 4 pages.

Rubinstein et al., "Crystallographic Data for Rare-Earth Aluminum Garnets: Part II," The American Mineralogist, vol. 50, May-Jun. 1965, pp. 782-785.

International Preliminary Examination Report from PCT Application No. PCT/US2017/037876, dated Dec. 27, 2018.

Payne et al., U.S. Appl. No. 16/306,865, filed Dec. 3, 2018.

Restriction Requirement from U.S. Appl. No. 16/306,865, dated Mar. 20, 2020.

Notice of Allowance from U.S. Appl. No. 16/306,865, dated Jun. 30, 220.

Payne et al., U.S. Appl. No. 17/027,526, filed Sep. 21, 2020.

Restriction Requirement from U.S. Appl. No. 17/027,526, dated Mar. 15, 2023.

Non-Final Office Action from U.S. Appl. No. 17/027,526, dated Jul. 11, 2023.

Notice of Allowance from U.S. Appl. No. 17/027,526, dated Dec. 28, 2023.

* cited by examiner

FIG. 1A  FIG. 1B

LASER GAIN MEDIA FABRICATED VIA DIRECT INK WRITING (DIW) AND CERAMIC PROCESSING

RELATED APPLICATIONS

This application is a divisional of U.S. patent application Ser. No. 17/027,526, filed Sep. 21, 2020 (published as U.S. PG Pub. No. 2021/0098957), which is a continuation of U.S. patent application Ser. No. 16/306,865, filed Dec. 3, 2018 (published as U.S. PG Pub. No. 2019/0348809), which is a national phase entry from International Application No. PCT/US2017/037876, filed Jun. 16, 2017 (published as WO/2017/218895), which is entitled to priority from U.S. Provisional Patent Application No. 62/351,866, filed Jun. 17, 2016. This application claims priority to the foregoing applications, each of which is also hereby incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to three-dimensional (3D) printing and fabrication, and more particularly to direct ink writing (DIW) of ink compositions to generate green bodies compatible with ceramic processing techniques to enable formation of optics having unique structural and compositional characteristics conveyed via DIW fabrication.

BACKGROUND

Certain transparent ceramic materials have been demonstrated as suitable for use as laser gain media. Generally, nanoparticles are synthesized from ceramic precursor materials (e.g. metal salts) via chemical or combustion means, and then mixed with organic solvents, water, surfactants, or mixtures thereof to create an ink. The ink is formed into a "green body" which generally has the shape and dimensions, preferably aspect ratio, of the resulting optic but includes surface modifying compounds/groups as well as liquid and/or organic components, as well as porosity. The green body is cast into a die or other suitable mold, or produced as a free-standing monolith and formed into a solid body. Next, the surface modifying compounds/groups, liquid and organic components are removed. The resulting structure is densified to remove residual porosity and to form the final optic.

For optics to be used as laser gain media, the final optic typically includes a suitable optically-active dopant that acts as a lasing center, and generates the output laser beam. The dopant may be dispersed throughout the optic, or may be present in select regions, e.g. using a layered synthesis technique whereby multiple layers of green body material each having different compositions are formed into a single monolith.

While the foregoing conventional techniques and compositions result in useful optics, in some cases suitable for use as laser gain media, such optics suffer from undesirable structural and operational characteristics. For instance, precise control over the compositional and structural features of the optics produced using the above techniques may give rise to undesirable operational characteristics such as unstable optical mode, thermal lensing, optical distortion, reduced efficiency, and parasitic oscillations.

Accordingly, it would be beneficial to provide systems, methods, and materials suitable for generating optics that overcome the foregoing limitations imposed by conventional fabrication techniques so as to improve the function of the resulting optics, e.g. as laser gain media, by stabilizing the optical mode, compensating for thermal lensing, minimizing optical distortion, maximizing the efficiency, and reducing parasitic oscillations.

SUMMARY

In accordance with one general aspect of the presently disclosed inventive concepts, a transparent ceramic optic includes: a lasing region comprising at least one lasing species dopant; and a transparent region transparent to light generated by the lasing species. At least the transparent region is doped with at least one other dopant species such that the lasing region and the transparent region are characterized by a difference in refractive index between the two regions in an amount of about $1.0 \times 10^{-4}$ or less.

Other aspects of the present disclosure will become apparent from the following detailed description, which, when taken in conjunction with the drawings, illustrate by way of example the principles of the invention.

BRIEF DESCRIPTION OF THE DRAWINGS

FIGS. 1A-1B are simplified, cross-sectional schematics of a transparent ceramic optic, e.g., a laser gain medium, in accordance with several aspects of the present descriptions.

DETAILED DESCRIPTION

Figure 1C:
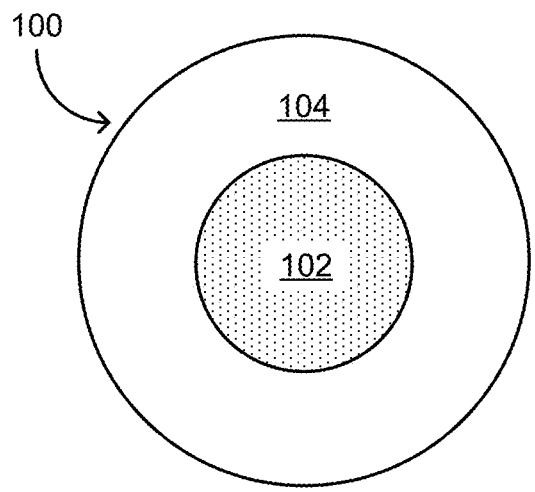
FIG. 1C shows a simplified side-view schematic of a transparent ceramic optic having a lasing region and a transparent region, according to one exemplary structural arrangement.
Figure 1C:
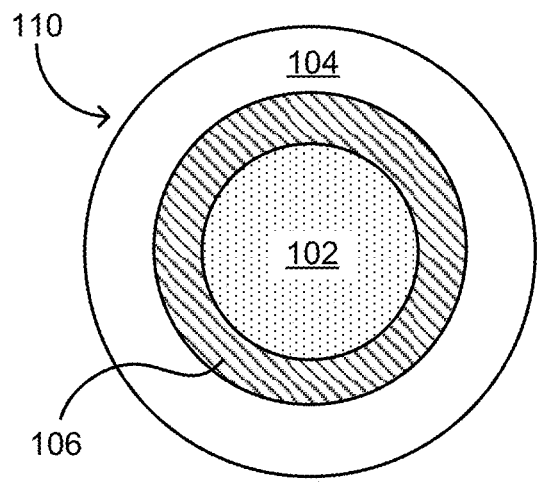
Figure 1C:
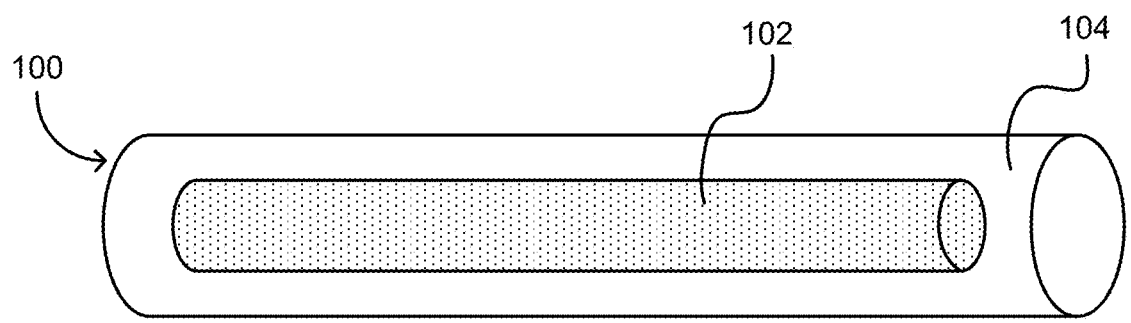

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The term "dopant" as used in the instant descriptions shall be understood to encompass any element or compound that is included in a host medium material, so as to convey a particular functional characteristic or property on the resulting structure. In most cases, the dopant will be incorporated into a crystal structure of the host medium material, e.g. during ceramic processing. Skilled artisans will appreciate upon reading the present disclosure that dopants may include one or more dopant lasing species, e.g. included to convey lasing capabilities on a resulting structure. Dopants may additionally or alternatively include other species, e.g. included to tune optical properties such as refractive index of various spatial regions of the resulting structure.

The following description discloses several preferred optics formed via direct ink writing (DIW), extrusion freeform fabrication, or other equivalent techniques and therefore exhibit unique structural and compositional characteristics conveyed via the precise control allowed by such techniques. The optics are particularly suitable for use as laser gain media, as the fabrication process enables tailoring of the composition and structure to compensate for common and undesirable characteristics of laser media formed via conventional processes.

A core theme of transparent ceramic processing is the controlled growth of grains, e.g. from an initial size of ~10-1000 nm to a final size of 1-100 μm, such that voids and second phase material are minimized. This produces an optic with desirably low optical scatter. As described herein, illustrative ceramic processing may include sintering, optionally in a vacuum, calcining, firing, pressing, and hot and/or cold isostatic pressing. Of course, other suitable ceramic processing procedures that would be understood by a person having ordinary skill in the art upon reading the instant disclosure may additionally or alternatively be employed without departing from the scope of the inventive concepts presented herein.

In addition to controlling grain size to yield desirable optical scatter properties in the optics disclosed herein, the stoichiometry of the nanoparticles used to form the final optic must be carefully compositionally balanced to achieve desirable phase stability and yield high transparency. For example, in illustrative formulations generally having a formula $M^1{}_3M^2{}_3O_{12}$; where $M^1$ is selected from Gd, Y and Ce, Lu, Er, Yb, and mixtures thereof; and $M^2$ is selected from Ga, Sc, Al, and mixtures thereof, desirable phase stability and transparency were exhibited.

In one experiment, three base compositions: (I) $Gd_3Ga_{2.2}Al_{2.8}O_{12}$, (II) $Gd_{1.5}Y_{1.5}Ga_{2.2}Al_{2.8}O_{12}$; and (III) $Gd_{1.5}Y_{1.5}Ga_{2.5}Al_{2.5}O_{12}$ were studied and for each composition the rare earth content was varied according to the formula $(Gd, Y, Ce)_3(YxGa_{1-x})_2(Ga,Al)_3O_{12}$; where $-0.01<X<0.05$. Visual transparency of the polished ceramics indicated that both yttrium and gallium are necessary to expand the phase stability region beyond $0 \leq X \leq 0.01$. X-ray diffraction (XRD)-determined lattice expansions correlated well with the explanation that the phase stability region is due to inter-ionic substitution of the various sized ions between the three cationic garnet lattice sites.

In accordance with one general aspect of the presently disclosed inventive concepts, a composition of matter includes a plurality of particles in a thixotropic suspension to form an ink. The plurality of particles are present in an amount of at least about 20 vol %, preferably an amount in a range from about 20 vol % to about 70 vol %, more preferably an amount in a range from about 40-60 vol %, and most preferably about 35-50 vol % of the ink composition. The particles include at least two constituents from among: (1) a first host medium material containing one or more lasing species dopants, one or more other dopant species, or both; (2) an undoped host medium material; and (3) a second host medium material that includes at least one other dopant species, e.g. a dopant species for conveying saturable absorption, magnetic properties, and/or tuning a refractive index profile of the optic to be formed from the ink precursor. The ink also includes a liquid phase, present in an amount greater than about 20 vol % and less than about 80 vol %. The liquid phase includes at least one of: surfactant(s); binder(s) and solvent(s) (preferably polar organic solvents).

In another general aspect of the inventive concepts disclosed herein, a transparent ceramic optic includes: a lasing region comprising at least one lasing species dopant; and a transparent region transparent to light generated by the lasing species. At least the transparent region is doped with at least one other dopant species such that the lasing region and the transparent region are characterized by a difference in refractive index between the two regions in an amount of about $1.0 \times 10^{-4}$ or less.

In accordance with yet another general aspect of the inventive concepts disclosed herein, a method of forming a transparent ceramic optic includes depositing a plurality of layers of at least one optic precursor ink to form a monolith using a technique selected from: direct ink writing (DIW)

and extrusion freeform fabrication and performing at least one ceramic processing technique to process the monolith to transparency. The ceramic processing techniques may include any combination of cold isostatic pressing (CIP) the monolith; calcining the CIP'ed monolith; sintering the calcined monolith; and/or hot isostatic pressing (HIP) the sintered monolith, employing the parameters set forth herein.

Ink Formulations

Accordingly, in preferred approaches the composition of inks used to form the inventive optics described herein includes a plurality of particles, such as highly sinterable flame spray nanopowder(s) suspended in a liquid phase. The particles, in the size range of 10-1000 nm may be referred to as nanoparticles, or particles, more generally, and comprise at least 20 vol % of the composition, while the liquids comprise the balance, e.g. from about 20 to about 80 vol %. The particles include host medium material having either one or more lasing species, one or more non-lasing species, or both; one or more undoped host medium materials, and (optionally) one or more host medium materials doped with at least one dopant species, while the liquids added to coat the particles includes one or more components selected from: at least one surfactant, at least one solvent such as a polar organic solvent, and at least one binder.

The particle constituents and liquid phase constituents are present in amounts effective to make the composition extrudable by an additive manufacturing apparatus such as a DIW apparatus or droplet printer, as well as to exhibit rheological properties such that, upon deposition of the ink, the material does not exhibit significant deformations from the as-deposited form, such as slumping, sagging, dispersion along the surface onto which the ink is deposited, etc. Thus, the ink may be deposited so as to form a monolithic structure that substantially retains its shape throughout the deposition process and thereafter, during and following ceramic processing procedures such as described below with reference to FIG. 7 and method 700. In a preferred approach, the ink exhibits shear thinning during extrusion or deposition, and returns to a higher viscosity after printing, in order to fabricate spatially controlled structures, including the high aspect ratio green bodies needed to produce a laser rod.

The lasing species dopant(s) of the nanoparticles may include trivalent rare earth ions and/or transition metals, in various approaches. For instance, particulate lasing species dopant(s) may include one or more trivalent rare earth ion dopants such as Pr, Nd, Sm, Eu, Tb, Dy, Ho, Er, Tm, and/or Yb; while transition metal dopants may include one or more of: Ti, V, Co, Cr, Fe and Ni, in any combination or permutation. In certain applications, such as for Q-switching, it is advantageous to include at least two different lasing species dopants in the optic, although such lasing species dopant(s) may be provided in different inks so as to allow flexibility and precise control over the positional arrangement of the dopant species throughout the bulk volume of the optic.

The host medium material preferably comprises particles and/or nanoparticles, which may include any suitable compound(s) that will form a medium that is transparent to light generated by one or more, preferably all, of the lasing species dopant(s) included in the ink and final optic. For instance, host medium species may include particles or nanoparticles having characteristics of a garnet structure such as Yttrium Aluminum Garnet (YAG) or any equivalent thereof that would be appreciated by a person having ordinary skill in the art upon reading the present descriptions. The host medium species preferably form a polycrystalline, cubic phase material upon deposition and ceramic processing as described with reference to FIG. 7 and method 700, below.

The host medium material is suitable for incorporating lasing species dopants and/or other dopants present in the ink into a crystal structure exhibited by the final optic, and as such the host medium material may preferably include any two or more of Y, Gd, La, Ce, Lu, Sc, Ga, Al, and O. In particularly preferred aspects, the host medium material exhibits a general formula: $M^1_3M^2_3O_{12}$, where: $M^1$ is selected from Gd, Y, Lu, Er, Yb, Ce, and mixtures thereof; while $M^2$ is selected from Ga, Sc, Al, and mixtures thereof. Host medium materials exhibiting compositions within the general formulae set forth above may be included singly or in combination in various ink compositions in accordance with aspects of the presently disclosed inventive concepts. In this manner, optics having more than one host medium material may be formed, and even optics having gradual or abrupt transitions from one host medium material to another may be realized using precisely controlled fabrication techniques such as DIW.

The ink may include other dopant species, and in preferred aspects other dopant species may include any compound(s) suitable for balancing a refractive index of the region of the optic in which the other dopant species is present (generally the transparent region, but also potentially including portions of the lasing region, see below descriptions and FIGS. 1A-1B) with the refractive index of the lasing region, especially as the optic increases in temperature during operation thereof. Accordingly, in particularly preferred approaches the dopant effectively cancels or minimizes the effects of thermal lensing. In various aspects of this theme, the other dopant specie(s) may include any one or more of Lu, La, Ce, Sc and Ga, singly or in any suitable combination thereof. In particularly preferred approaches, such as where the lasing species dopant comprises Nd, the other dopant species includes Lu, most preferably in a stoichiometric ratio of approximately 1:5 (Nd:Lu).

Turning again to the ink compositions described herein, particles of the host medium material, lasing species dopant(s) and other dopant species are preferably present, in the aggregate, in an amount ranging from about 20 vol % to about 70 vol %, preferably greater than about 40 vol % to about 60 vol %, so as to minimize shrinkage of the green body during sintering. The particle size may range from a few (e.g. 5-10) nanometers in diameter up to several (e.g. 3-5, but up to 100) microns, and is most preferably in the 10-300 nm size range.

For the liquid phase of the ink, surfactant(s) is/are preferably present in an amount ranging from greater than about 0 vol % to about 40 vol % of the ink composition, and is or includes an organic acid surfactant such as ammonium polymethacrylate, methacrylic acid and/or derivatives thereof, MEEAA (2-[2-(2-methoxyethoxy)ethoxy] acetic acid, and/or other suitable clean-burning surfactants of the type that would be appreciated by a skilled artisan upon reading the present descriptions, e.g. DARVAN® C-N. Of course, in various approaches more than one surfactant may be included in a given ink composition. The surfactant(s) preferably are included in an amount sufficient to promote uniformity of the ink, and substantially prevent the formation of agglomerates by the particles of the ink.

With respect to the solvent(s), the solvent(s) preferably is/are present in an amount ranging from greater than about 10 vol % to about 70 vol % of the ink composition, and may include any combination of: water, one or more alcohols, one or more cyclic carbonates such as propylene carbonate, one or more ethylene oxide-based glymes (also referred to as PEG-based glymes), one or more propylene oxide-based glymes, and one or more propylene glycol-based glymes (also referred-to as polypropylene-based glymes or PPG-based glymes).

The binder(s), in various approaches, is/are present in an amount ranging from greater than about 0 vol % to about 60 vol % of the ink composition, and include one or more of the following exemplary binders, and/or equivalents thereof, in any combination: polyethylene glycol (PEG) or a glyme thereof; polypropylene glycol (PPG) or a glyme thereof; methacrylic acid or a derivative thereof; and polymerizable glycol(s).

Figure 3A:
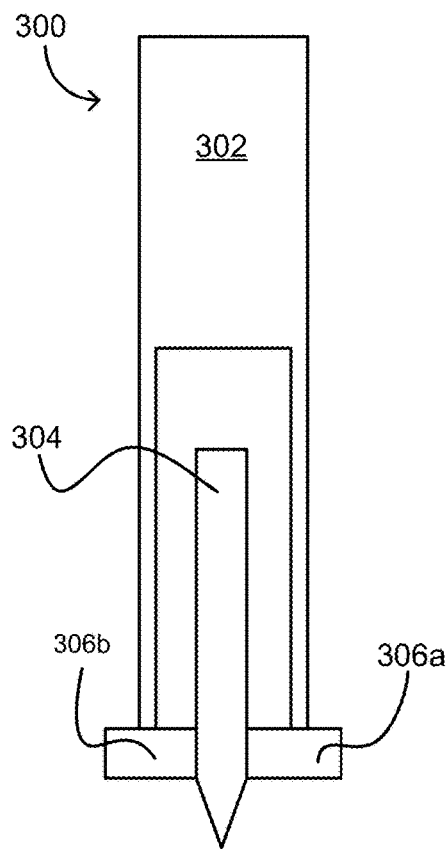
FIG. 3A is a simplified schematic of a direct ink writing (DIW) nozzle suitable for use in forming transparent ceramic optics disclosed herein.
Figure 3B:
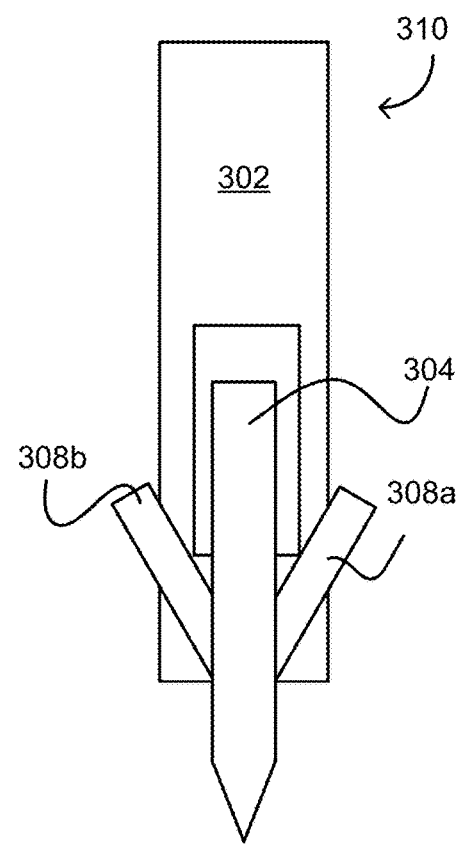
FIG. 3B is another simplified schematic of a direct ink writing (DIW) nozzle suitable for use in forming transparent ceramic optics disclosed herein.

In various approaches, more than one ink can be employed in writing the desired green body prior to the numerous consolidation steps, and it is therefore possible to devise complex structures with different regions of optical and thermal functionality. Further, the use of a "mixing nozzle" such as shown in FIG. 3B allows fine tuning of compositional gradients as a function of the DIW nozzle position and flow of two or more inks into the mixing nozzle.

Therefore, the presently disclosed inventive concepts also include compositions of inks capable of being written into a defined body while remaining compatible with ceramic processing steps such as cold pressing, firing, calcining, sintering, and hot isostatic pressing.

An example of a direct-write ink is a mixture of the powder, solvent, binder, and surfactant, as noted in Table 1, below. This example is not intended to limit the possible combinations of liquids that impart the desirable properties of the ink, including the "writing", drying, calcination, and consolidation.

ink may comprise 10-70 vol % of the solvent, more preferably about 20-40 vol % solvent.

In more approaches, the ink includes a binder, such as polyethylene glycol (PEG) in an amount ranging from about 0-60 vol %, preferably about 5-30 vol %.

In addition to the binder, solvent, and surfactant, in more approaches the ink comprises particles or nanoparticles which will be written via DIW and ultimately formed into the optic material via the ceramic processing steps of the fabrication process. The particles or nanoparticles may comprise, in various approaches, about 10-70 vol % of the ink composition, preferably about 35-50 vol % of the ink composition.

As will be understood by persons having ordinary skill in the art upon reading these descriptions, the ink may comprise one or more of the foregoing components (surfactant, binder, solvent, particles) in any suitable ratio within the individual ranges set forth above to form a complete ink composition.

As noted above, preferably the ink compositions described herein exhibit rheological properties such that they may flow freely from the nozzle during writing, due to shear thinning. Upon exit from the nozzle, the ink viscosity increases back to about its zero shear viscosity, preferably forming a monolith that is able to retain the form in which it was written, without excessive slumping or changes in the composition of the ink or slurries from which any given portion of the monolith is formed (e.g. mixing of constituents present in a given region or regions within a layer, or between layers, to form a homogenous concentration within the layer(s)) Instead, advantageously the ink substantially maintains its structure and composition as-written during

TABLE 1

Exemplary DIW ink composition suitable for forming green bodies compatible with ceramic processing to form transparent ceramic optics such as laser gain media.

| Name/Slurry Component | Abbreviation | Formula | Molecular Weight (g/mol) | Density (g/mL @ 25° C.) |
|---|---|---|---|---|
| Yttrium aluminum oxide (yttrium-aluminum-garnet)/nanopowder | YAG | $Y_3Al_5O_{12}$ | 593.62 | 4.500 |
| Polyproylene carbonate/solvent | PPC | $C_4H_6O_3$ | 102.09 | 1.189 |
| Poly(ethylene glycol)/binder | PEG-400 | $(C_2H_4O)nH2O$ | — | 1.128 |
| 2-[2-(2-Methoxyethoxy)ethoxy] acetic acid/surfactant & dispersant | MEEAA | $C_7H_{14}O_5$ | 178.18 | 1.161 |

For instance, in various approaches the ink may include an organic acid surfactant such as MEEAA, 2-[2-(2-Methoxyethoxy) ethoxy] acetic acid, methoxyacetic acid, ethoxyacetic acid, butoxyethoxyacetic acid, methoxypropionic acid, butoxyacetic acid or equivalents thereof that would be appreciated by a person having ordinary skill in the art upon reading the instant descriptions. The surfactant preferably improving the uniformity of the ink and prevents formation of aggregates and/or agglomerates therein. To this effect, in various approaches the surfactant may comprise about 0-40 vol % of the ink, more preferably about 10-20 vol %.

The ink may also include a solvent, e.g. a polar organic solvent. This solvent may include individual components selected from the alkyl carbonates, glymes, glycols, alcohols, which may be used alone or in mixtures and may include water. The solvent advantageously improves the flow characteristics of the ink, such that the ink is extrudable via the DIW nozzle. Accordingly, in various approaches the and after the writing process is complete. In general, the desirable rheological properties are conveyed by the various components of the ink being present in the respective amounts set forth herein. In particular, high loading (e.g. ≥40 vol %) of particles coupled with presence of all three components of the liquid phase in the respective amounts set forth herein convey a particularly advantageous rheological profile on the resulting ink formulations.

Figure 8:
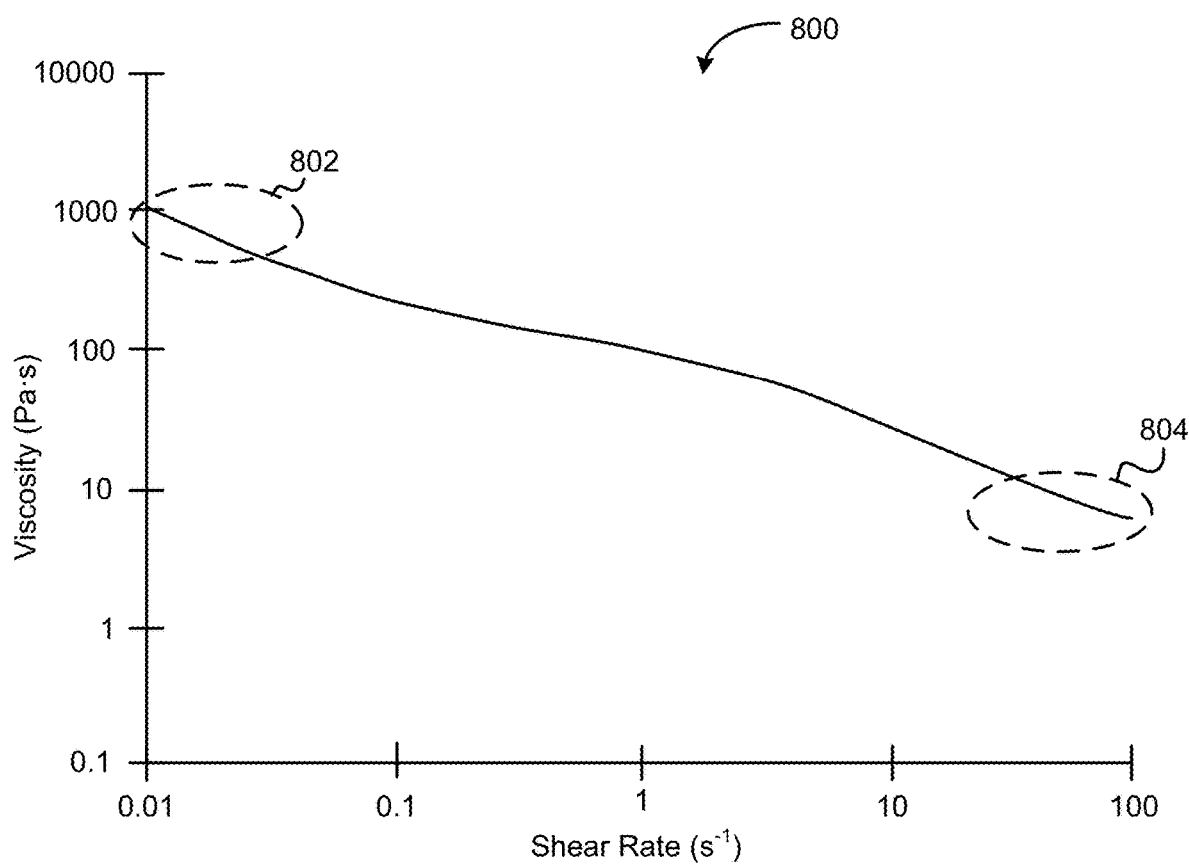
FIG. 8 shows a desirable rheology curve for an ink used to fabricate a laser gain element.

FIG. 8 shows the rheology of a preferable ink composition, exhibiting shear thinning at high shear and increased viscosity at zero shear. FIG. 8 is a plot 800 of the ink viscosity as a function of the shear rate, for an ink that exhibits thixotropic behavior, as described next. As such, very low shear rate on the right hand side, indicated by region 804 corresponds approximately to the ink after it has exited the nozzle. On the other hand, high shear rate experienced in region 802, greater than about 1 s$^{-1}$, corresponds to the viscosity while the ink is traversing the nozzle during writing or extrusion.

Of course, it will also be appreciated that further processing, e.g. as described below with reference to method 700 and FIG. 7, may smooth out discrete gradients into smooth gradients, particularly with respect to concentration (e.g. a stepped gradient defined by a plurality of layers each having a different composition may be rendered into a smooth gradient in the final optic).

In several approaches, at least one of the constituents of the ink composition may have a boiling point on the order of, or greater than, about 200 C.

During the deposition process, various ink compositions may be employed in sequence and/or in combination, e.g. to form discrete regions and/or continuous gradients exhibiting desired functional properties such as refractive index profile, Q-switching, mode selection, etc. as described herein. The ink compositions may be combined during the deposition process via the use of an appropriate mixing nozzle, such as shown in FIGS. 3A and/or 3B, described further below.

Transparent Ceramic Optics

Turning now to the inventive optics as disclosed herein, and with reference to FIGS. 1A-1D, several exemplary structures are shown. It should be understood these structures are presented by way of example, and are not intended to be limiting on the scope of the invention. Certain structural and/or compositional features may be particularly useful in different contexts and/or applications such as thermal lensing, mode selection, and/or Q-switching, discussed in greater detail below.

FIGS. 1A-1B depict two exemplary cross-sectional structures of transparent ceramic optics 100, 110 within the scope of the presently described inventive concepts. Each structure is characterized by a substantially circular cross-sectional profile, but in other approaches the optics may have other cross-sectional profiles, such as a polygon or a slab type form factor. The specific form of the optic and cross sectional profile thereof may be defined based on the application to which the optic will be employed, and is limited only by the patterns the additive manufacturing apparatus (e.g. DIW apparatus) used to fabricate the optic is capable of forming.

Optics 100 and 110 also each include an inner, lasing region 102 substantially surrounded by a concentric outer, transparent region 104. The lasing region 102 includes at least one lasing species dopant(s) that generates light of a particular wavelength in response to stimulation by a source, such as a laser diode, flashlamp, or other suitable pumping mechanism as would be understood by a person having ordinary skill in the art upon reading the present disclosure. Transparent region 104 is preferably transparent to at least the wavelength of light generated by the lasing species dopant(s), so as to generate maximum output from the optic.

As shown in FIG. 1A, optic 100 is characterized by an abrupt transition from the lasing region 102 to the transparent region 104, but it is also possible to include a concentration gradient with respect to the lasing species dopant(s) and/or an optionally included other dopant species in a region 106 between or transitioning from the lasing region 102 and transparent region 104, as shown in FIG. 1B. In one exemplary approach, a gradient of Lu dopant is present in region 106.

Importantly, the concentration gradient (especially with respect to lasing and/or other dopant species) may be a radial concentration gradient, which is particularly difficult to form using conventional casting and ceramic processing techniques. In the context of the present invention, it is only possible to define an appropriate concentration gradient using the precise control afforded by additive manufacturing techniques such as DIW and extrusion freeform fabrication. Moreover, the precise stoichiometric ratios of other dopant species and/or lasing species dopant(s) required to accomplish desired differences in refractive index of the lasing region 102 and transparent region 104 (optionally including transition region 106) require use of advanced formation techniques described herein to generate a suitable optic having the preferred functional characteristics.

Preferably, the concentration gradient may be in the form of a smooth, continuous Gaussian distribution with maximum lasing species dopant(s) concentration at the center of the cross section shown in FIGS. 1A-1B. The gradient may extend across at least about ¼ to about ½ of a radius of the cross section as shown in FIGS. 1A-1B, resulting in a graded profile, preferably a graded refractive index profile where the gradient is with respect to lasing species dopant(s) and one or more other dopant species configured to bring the refractive index of part or all of the transparent region 104 into substantial conformity with the refractive index of lasing region 102, optionally within a particular temperature range such as an operating temperature of the laser rod when pumped with an appropriate source. "Substantial conformity" in this context includes a difference in radial index between the lasing region 102 and transparent region 104 on the order of $1 \times 10^{-3}$ or less, preferably $1 \times 10^{-4}$ or less, and most preferably $1 \times 10^{-5}$ or less, in various approaches.

Optics 100, 110 and equivalents thereof described herein are therefore formed from one or more "inks" as described above, allowing precise, layer-by-layer formation of a variety of gradients and structural features. In some approaches, each layer may be deposited according to a predefined pattern, such as a spiral or serpentine pattern, beginning from the innermost portion of the layer and completing with the outermost portion of the layer. Of course, any suitable pattern of depositing a particular layer or set of layers may be employed without departing from the scope of the instantly disclosed inventive concepts. Preferably, the pattern is suitable to form a radial concentration gradient with respect to the lasing species dopant(s) in the optic, which advantageously provides gain profile mode-matching, a desirable intensity distribution and corresponding improvements to lasing efficiency and mode stability of the optic.

Referring now to FIG. 1C, a side view simplified schematic of the optic 100 shown in FIG. 1 is depicted in accordance with an exemplary aspect of the inventive concepts described herein. In particular, the optic 100 includes the inner, lasing region 102, as well as a concentric, surrounding transparent region 104. The lasing species dopant(s) is present in the lasing region 102, which extends along a substantial majority (e.g. about 80% or more) of the longitudinal axis of the elongated optic. Such configurations are particularly useful for applications such as gain media, especially laser gain media. As shown in FIG. 1C, the lasing region 102 may include uniform distribution of one or more lasing species dopant(s) throughout the lasing region 102, or a gradient, e.g. a Gaussian concentration gradient with respect to one or more lasing species dopant(s) therein, with the maximum concentration of lasing species dopant(s) occurring at substantially the midpoint of the longitudinal axis.

Of course, the gradient may be stepped, linear (e.g. minimum lasing species dopant(s) concentration at one end of the optic 100 and maximum lasing species dopant(s) concentration at the opposite end of the optic 100), multimodal, etc. in various approaches consistent with the presently described inventive concepts.

Figure 1D:
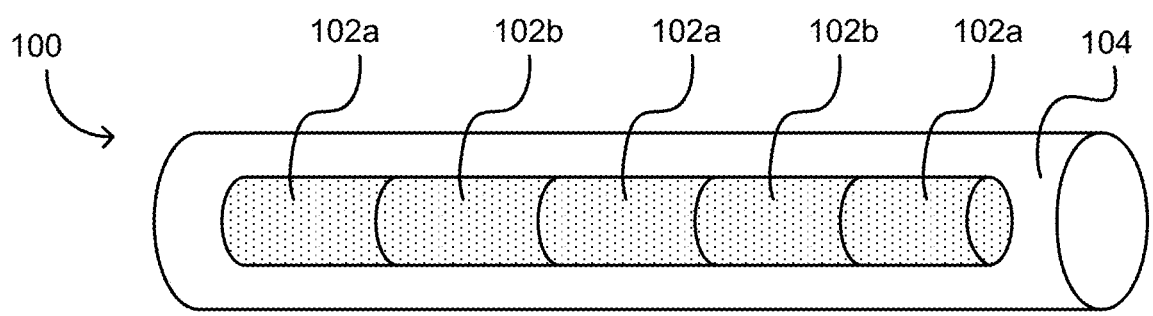
FIG. 1D shows a simplified, side-view schematic of a transparent ceramic optic such as shown in FIG. 1C, but having multiple distinct sections of the lasing region, at least some of the sections including different lasing species, according to an exemplary approach.

Another aspect of the inventive optics presented herein includes formation of multiple discrete sections 102a, 102b along the lasing region and longitudinal axis of the optic, as shown in FIG. 1D. In the approach depicted in FIG. 1D, the sections 102a and 102b alternate along the length of the optic 100, and sections 102a include at least one other dopant species and/or lasing species dopant(s) not present in sections 102b, while sections 102b include at least one other dopant species and/or lasing species dopant(s) not present in sections 102a. Each of the sections 102a, 102b may comprise multiple lasing species dopants in any combination described herein, so long as at least one lasing species dopant and/or other dopant species combination present in a first of the adjacent sections differs from the at least one lasing species dopant(s) and/or other dopant species combination present in the second of the adjacent sections. Other approaches similar to the particular example of FIG. 1D may include more than two section "types" arranged in any suitable sequence or pattern, such as repeating patterns of adjacent triplets, quadruplets, quintets, etc. of sections, and/or a sequence of uniquely composed, non-repeating sections, etc. as would be appreciated by a person having ordinary skill in the art upon reading the present descriptions. In several approaches optics as described herein may include more or less sections than shown in FIG. 1D, as will be appreciated by persons having ordinary skill in the art upon reading the instant disclosure.

In a particularly preferred approach, sections 102a comprise Nd as a lasing species dopant, and sections 102b comprise Cr as a lasing species dopant. As described further below regarding Q-switching, such arrangements advantageously suppress the adverse effect(s) of Nd→Cr energy transfer exhibited by Q-switched optics produced by conventional means with the Cr and Nd dopants mixed at an atomic scale, as well as detrimental absorption of pump energy by Cr ions and corresponding thermal lensing.

Of course, the optics 100 shown in FIGS. 1C and 1D may also include radial concentration gradients of the lasing species dopant(s) and/or other dopant species as discussed above with reference to FIG. 1B, without departing from the scope of the inventive concepts described herein.

Accordingly, in an exemplary aspect of the presently disclosed inventive concepts, the optics may be in the form of a transparent ceramic optic having a lasing region 102 comprising at least one lasing species dopant, a transparent region 104 transparent to light generated by the lasing species, and optionally another dopant species or combination of other dopant species present in at least the transparent region, such that the lasing region 102 and transparent region 104 exhibit a difference in refractive index ($\Delta RI$) on the order of $1 \times 10^{-3}$ or less.

Figure 2:
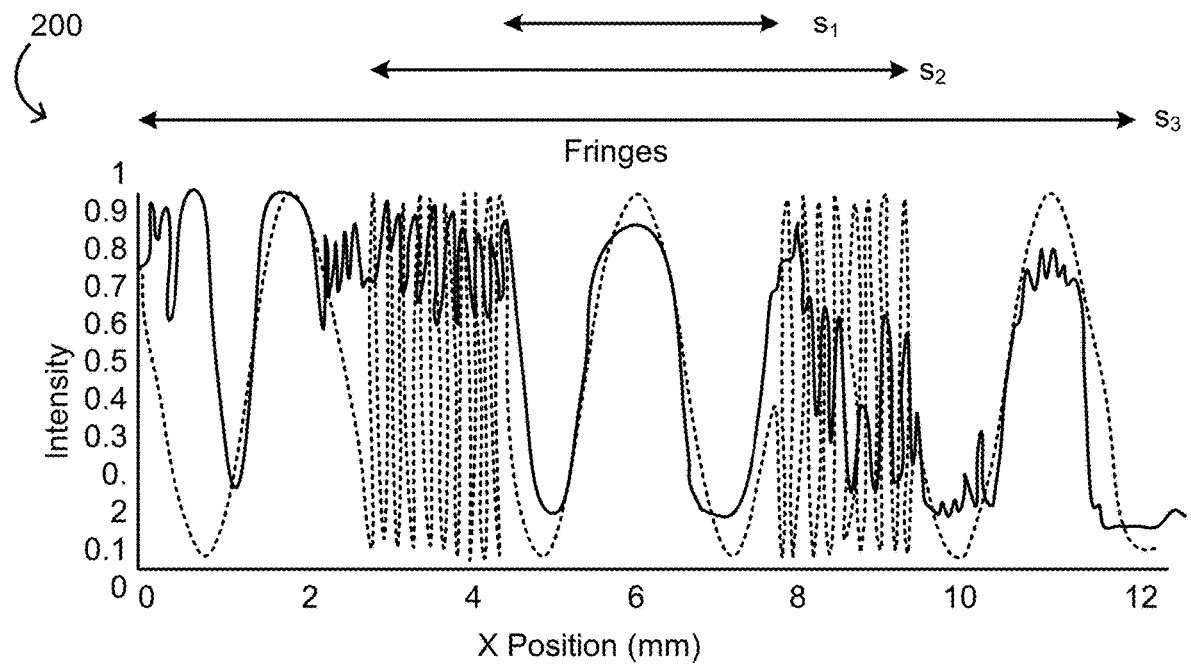
FIG. 2 is a plot modeling differences in refractive index (RI) for three cross-sectional regions of a transparent ceramic optic such as shown in FIG. 1B.

FIG. 2, according to one approach, shows a model 200 based on interferogram data gathered in connection with an exemplary optic lacking the optional other dopant species to balance refractive indices of the lasing and transparent regions. The model reveals the refractive index of a lasing region (e.g. 102 as shown in FIGS. 1A-1B, corresponding to $s_1$ of FIG. 2) doped with Nd differs from that of a transition region (e.g. 106 as shown in FIG. 1B, corresponding to $s_2$ of FIG. 2), and a transparent region (e.g. 104 of FIG. 1B, corresponding to $s_3$ of FIG. 2) undoped with Nd. The model shown in FIG. 2 was generated using an optic in which the lasing region 102 is Nd-doped garnet $(Gd, Y)_3(Sc,Al)_5O_{12}$, and the transparent region 104 is undoped garnet $(Gd, Y)(Sc,Al)_5O_{12}$.

Structures such as shown in FIGS. 1A-1D, and variations thereof as described herein may be advantageously formed using a tool such as a DIW apparatus, examples of which are depicted in FIG. 3A-3B. In brief, each apparatus 300, 310 includes a housing 302 with fluidics for delivering an extrusion mixture (e.g. the inks described herein) to a nozzle 304 for extrusion and deposition of the mixture onto a substrate. The nozzles 304 are "mixing nozzles" which allow for simultaneous mixing and deposition of multiple different mixtures onto the substrate. For example, different compositions may be fed through channels 306a, 306b, 308a, and/or 308b leading into the nozzle 304 (of course, more than two channels may be present in various apparatuses) and inter-mixed in the nozzle 304 as part of the deposition process. The compositions may be provided in controlled amounts to the nozzle 304 (e.g. using different flow rates), allowing precise control over the composition deposited thereby.

Fabrication Techniques

As described in greater detail below with reference to FIG. 7 and method 700, the presently disclosed inventive concepts employ unique fabrication techniques where, rather than casting a particle/liquid ink in a container to form a green body, the ink is formulated so as to possess viscoelastic characteristics suitable for deposition, extrusion, or other formation of a green body via additive manufacturing (AM) techniques, particularly Direct Ink Writing (DIW) and extrusion freeform fabrication.

These techniques and tools facilitate precise control over the optic structure and composition not achievable using conventional formation techniques and systems. Those having ordinary skill in the art will appreciate that a given transparent ceramic optic may be formed using a combination of the sequential and mixed addition of ink compositions in any suitable manner to produce an optic having desired structural and compositional characteristics, and concomitant performance. Again, the use of additive manufacturing techniques particularly such as DIW enables the level of control over the formulation and structure of the optic in three dimensions such that the various optics described herein are characterized by feature resolution not achievable using conventional formation and ceramic processing techniques, conveying advantageous characteristics on such optics.

Without limitation, in the context of the present disclosure such characteristics may include concentration gradients of lasing species dopant(s) and/or other dopant species in a manner that, e.g.: (1) minimizes differences in refractive index between a lasing region and a transparent region of the optic (such as a radial concentration gradient of lasing species dopant(s) and other dopant species in a region transitioning between the lasing region and the transparent region of the optic, with lasing species dopant(s) and other dopant species present in a particular ratio); (2) minimizes thermal gradients during operation of the optic (such as a Gaussian gradient with respect to one or more lasing species dopant concentration(s) along a longitudinal axis of the optic, where the maximum concentration occurs substantially at the midpoint of the longitudinal axis, together with an inverse gradient of a second, other dopant or combination of other dopant(s) to counter the thermally-induced refractive index change); and/or (3) enables Q-switching (such as alternating sections having different individual or combinations of lasing species dopant(s) and/or other dopant species arranged along a longitudinal axis of the optic). Such gradients may be gradual or abrupt, in various approaches, and combinations of the various gradients described above may be employed in combination without departing from the scope of the instant disclosure.

Figure 7:
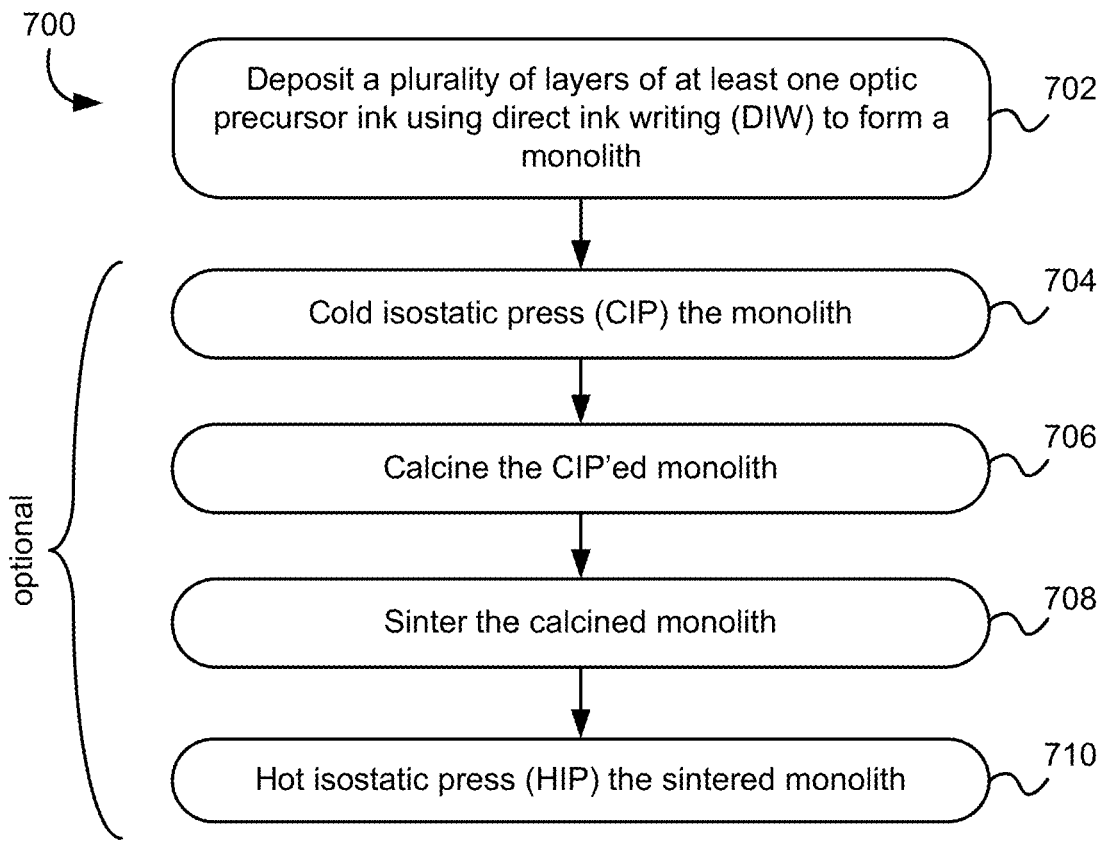
FIG. 7 shows a flowchart of a method for forming transparent ceramic optics as disclosed herein.

In general, forming functionally graded transparent ceramic optics as described herein may follow a method 700, such as set forth in FIG. 7. The procedure generally includes printing a transparent ceramic optic precursor ink via additive manufacturing, preferably DIW, and more preferably a variant of DIW known as extrusion freeform fabrication, to form a green body having a same or similar composition as set forth hereinabove regarding the inventive ink formulations.

Of course, as will be understood by skilled artisans upon reading the present descriptions, the as-written/extruded/etc. green body composition will change over time in response to exposure to various environmental conditions and/or ceramic processing steps disclosed herein. For instance, as reflected in FIGS. 4A-4B, an as-formed monolith 400 may shrink in volume after formation upon exposure to atmospheric temperature and pressure, but substantially retain its form and shape without significant slumping or other deformation. The volumetric reduction may be due, e.g., to evaporation of solvent from the as-formed monolith 400, resulting in a less voluminous but geometrically similar monolith 410.

The as-formed green body may be subjected to ceramic processing such as pressing, preferably cold isostatic pressing (CIP) to improve the structural strength thereof, and subsequently fired or calcined to remove organic and/or liquid components from the green body. The fired/calcined structure may be sintered, preferably under a vacuum, to densify the structure and preferably remove or close pores therein. Finally, to further densify the sintered ceramic, the structure may be subjected to further pressing, preferably hot isostatic pressing (HIP) to form the final optic, which is characterized by approximately 100% theoretical density of the ceramic material.

Accordingly, in various approaches the fabrication process may include one or more procedures selected from: drying at room temperature, drying at temperatures from about 25-250 Celsius, cold isostatic pressing for pressures of 5000-60,000 psi at temperatures of about 500 C or less, calcination in air or oxygen at or greater than or about 250 Celsius, hot pressing at 1000-60,000 psi and 600-1600 Celsius, vacuum sintering at 1000-1900 Celsius, controlled atmosphere sintering at 1000-1900 Celsius, helium sintering at 1000-1900 Celsius, oxygen sintering at 1000-1900 Celsius and hot isostatic pressing at 10,000-60,000 psi and 1000-2000 Celsius.

Referring again to FIG. 7, in an illustrative approach method 700 may include the following operations 702-710. The method 700 may be performed in any suitable environment and using any suitable instrumentation as described herein or would be appreciated by the skilled artisan as appropriate for forming a transparent ceramic optic of the type presently disclosed, without departing from the scope of the present application. In particular, method 700 may employ one or more DIW apparatuses such as shown in FIGS. 3A-3B in order to form monolithic green bodies such as shown in FIGS. 4A-4B.

As shown in FIG. 7, method 700 includes operation 702, in which a monolithic green body is formed by depositing a plurality of layers of at least one optic precursor ink using direct ink writing (DIW), extrusion freeform fabrication, or any other equivalent technique thereto that would be appreciated by a person having ordinary skill in the art upon reading the present descriptions. Each layer may comprise one, or multiple precursor ink formulations, which in turn may be formed by mixing multiple precursor ink formulations while writing the respective layer. Additionally or alternatively, each layer may be characterized by a gradient and/or be part of a larger gradient defined by multiple layers of the monolith.

Figure 4A:
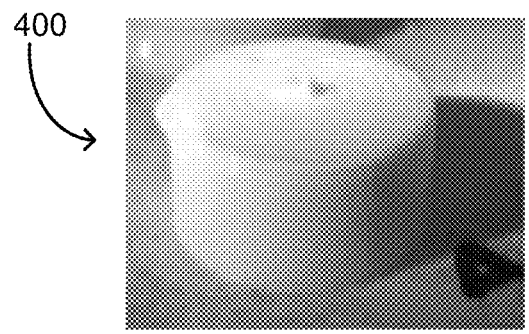
FIG. 4A is a photographic depiction of a monolith comprising a transparent ceramic optic precursor ink formed by DIW.
Figure 4B:
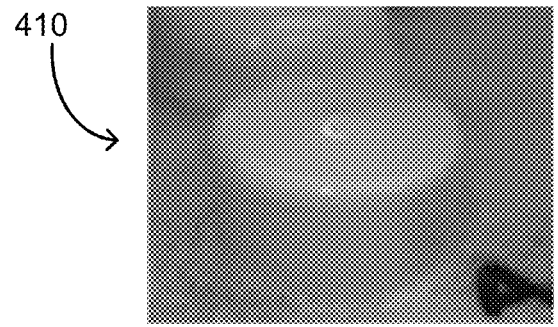
FIG. 4B is a photographic depiction of the monolith as shown in FIG. 4A after drying in air. Notably the monolith of FIG. 4B retains the same homogenous shape as formed by the DIW process and shown in FIG. 4A.

For instance, and in the exemplary cylindrical form of a monolith such as shown in FIGS. 4A-4B, a single-layer gradient may be formed radially, such that e.g. a central region of the cylindrical layer is characterized by presence of a lasing species, while an outer region of the cylindrical layer lacks the lasing species dopant(s) but may optionally include other dopant species, singly or in combination. As a further option, a radial concentration gradient may be formed in a region between the lasing region and the dopant region with respect to the lasing species dopant(s), the other dopant species, or both.

Further still, a gradient may be formed by writing multiple adjacent layers in succession, each layer having a slight or significant difference in concentration of one or more constituents, especially lasing species dopant(s), so as to generate a monolith having at least one concentration gradient along one or more axes thereof, preferably at least a longitudinal axis. For example, as shown in FIG. 1D a discrete concentration gradient may exist with respect to the lasing species dopant(s) and/or other dopant species in each pair of adjacent sections 102a, 102b. In more examples, the concentration gradient may be continuous, and represented by e.g. a Gaussian or linear curve along the axis of the gradient. In preferred approaches, again the gradient may be defined along the longitudinal axis, although it will be appreciated that latitudinal, radial, and other gradient orientations may be employed in any combination or permutation without departing from the scope of the present descriptions.

Referring again to FIG. 7, method 700 includes one or more, and preferably all, of optional operations 704-710, which generally include ceramic processing procedures.

In optional operation 704, the monolith formed in operation 702 is cold isostatic pressed (CIP'ed), optionally following drying in air and/or heating the as-formed structure. The CIP conditions preferably include applying uniform pressure to the monolith in an amount from about 5,000-60,000 psi for a predetermined duration and at a temperature of about 500 C or less. The optional drying and/or heating steps may involve drying in air for about 24 hours the as-written monolith, and/or heating in a furnace for up to 72 hours at a temperature of approximately 70 C, each of which facilitate densification of the as-written monolith without perturbation of the as-written shape thereof. In other words, the dried, heated monolith meets the definition of being geometrically similar to the as-written monolith.

While drying and heating advantageously increase the density of the monolith, e.g. to about 40-50% of the theoretical maximum density for the particular ink formulation, the CIP procedure further improves density, e.g. to about 50-60% of the theoretical maximum density. To facilitate maximum densification, the CIP process may be carried out according to a predetermined pressure schedule, including pressure ramps and/or incubation periods as would be understood by a skilled artisan reading the present descriptions. In general, CIP'ing the monolith improves the strength thereof.

With continuing reference to FIG. 7, optional operation 706 of method 700 involves calcining the CIP'ed monolith, e.g. heating the CIP'ed monolith to a temperature greater than or about 250 C in an atmosphere of air or oxygen for a predetermined duration. Calcining facilitates removal of residual liquid and/or organic components from the monolith, ideally leaving behind a monolith consisting essentially of highly sinterable nanoparticles such as host media species, lasing species, and/or dopant species in a predefined pattern defined by the DIW process (e.g. a pattern including one or more concentration gradients along one or more axes). Trace amounts of other constituents, particularly binder, may remain in the calcined monolith, but again preferably this is not the case.

Method 700 also optionally includes operation 708, in which the calcined monolith is sintered to close pores and further densify the monolith to approximately 90% or more of a theoretical maximum density of the pure composition of the nanoparticles in the calcined monolith. The sintering, in various approaches to operation 708, may include any combination of: vacuum sintering at a temperature in a range from about 1,000 C to about 1,900 C for a predetermined duration; controlled atmosphere sintering at a temperature in a range from about 1,000 C to about 1,900 C for a predetermined duration; helium sintering at a temperature in a range from about 1,000 C to about 1,900 C for a predetermined duration; and/or oxygen sintering at a temperature in a range from about 1,000 C to about 1,900 C for a predetermined duration.

In optional operation 710, method 700 includes hot isostatic pressing (HIP'ing) the sintered monolith to achieve substantially 100% of the theoretical density thereof, or of the nanoparticle composition therein. HIP'ing the sintered monolith preferably includes simultaneously applying a pressure to, and heating, the sintered monolith. The pressure is in a range from about 10,000 psi to about 60,000 psi; and the heating is performed to a temperature in a range from about 1,000 C to about 2,000 C.

It should be noted the exemplary method 700 shown in FIG. 7 is presented for illustrative purposes and should not be considered limiting on the scope of the inventive concepts described herein. For a given formulation of optic precursor ink(s), different combinations of conditions set forth above with respect to method 700 may be employed to accomplish the desired solids loading, strength improvements, removal of liquid and/or organic phases/constituents, closing of porosity and full/or densification to theoretical maximum, as will be understood by a person having ordinary skill in the art upon reading the present disclosure.

Moreover, a particularly advantageous consequence of using additive manufacturing techniques such as direct ink writing, extrusion freeform fabrication, and/or equivalents thereof is the ability to precisely define the composition and structural arrangement of the final optic by employing precise writing/extrusion techniques and precisely formulated precursor ink(s) in various combinations.

For instance, the depositing process of operation 702 may include defining one or more concentration gradients via the plurality of layers of the at least one optic precursor ink. The one or more concentration gradients may include one or more of: a radial concentration gradient with respect to at least one lasing species dopant of the at least one optic precursor ink; a longitudinal concentration gradient with respect to at least one lasing species dopant of the at least one optic precursor ink; and a radial concentration gradient with respect to at least one other dopant species of the at least one optic precursor ink, in preferred approaches. The gradients may be smooth, abrupt, continuous or discrete in various illustrative approaches.

Accordingly, the depositing operation of method 700 may include depositing a plurality of different optic precursor inks, each optic precursor ink comprising a different lasing species, a different dopant species, or both, in order to form the gradients, or precursors thereto (e.g. a stepped gradient formed by deposition which converts into a smooth gradient during/after ceramic processing as shown in FIG. 7). In one approach, at least some of the plurality of layers may include a first of the different optic precursor inks, and at least some other of the plurality of layers may include a second of the different optic precursor inks. Similarly, at least some of the plurality of layers may include at least a first and a second of the different optic precursor inks, although more than two inks may be used to form any given layer or layers during the fabrication process.

In a particularly preferred approach for forming a monolith exhibiting Q-switching, a first of the optic precursor inks used to form some of the layers of the monolith includes Nd as a lasing species dopant; while a second of the different optic precursor inks includes Cr as a lasing species dopant. Forming several layers (e.g. 5-10) using the first optic precursor ink, followed by several (e.g. 5-10) layers using the second optic precursor ink may produce a structure characterized by a lasing region having a plurality of discrete sections, each section including a different lasing species dopant than the immediately adjacent sections. Different lasing species dopant(s) may be present in each individual section, or alternating lasing species dopant(s) (and/or patterns thereof) may be employed in adjacent sections, in various approaches. Other dopant species may be included in any suitable combination in one or more of the alternating sections, and may be included so as to generate a concentration gradient and corresponding ΔRI profile as discussed hereinabove.

It should also be noted the optic precursor inks mentioned above with reference to FIG. 7 and method 700 may employ any composition falling within the ranges discussed hereinabove, as well as equivalents thereto that would be appreciated by a person having ordinary skill in the art upon reading these descriptions, without departing from the scope of the inventive concepts presented herein.

For instance, in general each optic precursor ink comprises a plurality of particles in a thixotropic suspension to form an ink. The plurality of particles are present in an amount of at least about 20 vol %, preferably an amount in a range from about 20 vol % to about 70 vol %, more preferably an amount in a range from about 40-60 vol %, and most preferably about 35-50 vol % of the ink composition. The particles include at least two constituents from among: (1) a first host medium material containing one or more lasing species dopants, one or more other dopant species, or both; (2) an undoped host medium material; and (3) a second host medium material that includes at least one other dopant species, e.g. a dopant species for conveying saturable absorption, magnetic properties, and/or tuning a refractive index profile of the optic to be formed from the ink precursor. The ink also includes a liquid phase, present in an amount greater than about 20 vol % and less than about 80 vol %. The liquid phase includes at least one of: surfactant(s); binder(s) and solvent(s) (preferably polar organic solvents).

Uses, Features and Applications
Mode Selection

One suitable type of bulk laser gain element deployed throughout laser technology is a laser rod, which may be configured as an elongated cylinder as shown in FIGS. 1C and 1D. Of course, other shapes or configurations such as cubes, panels, etc. may be employed without departing from the scope of the presently disclosed inventive concepts. A laser rod employed for the case of a laser oscillator is pumped by a laser diode array. As noted above, by use of DIW to fabricate the laser rod, the rod can be configured to have various compositional and/or structural features, which may convey one or more regions exhibiting desirable functionality.

Figure 5:
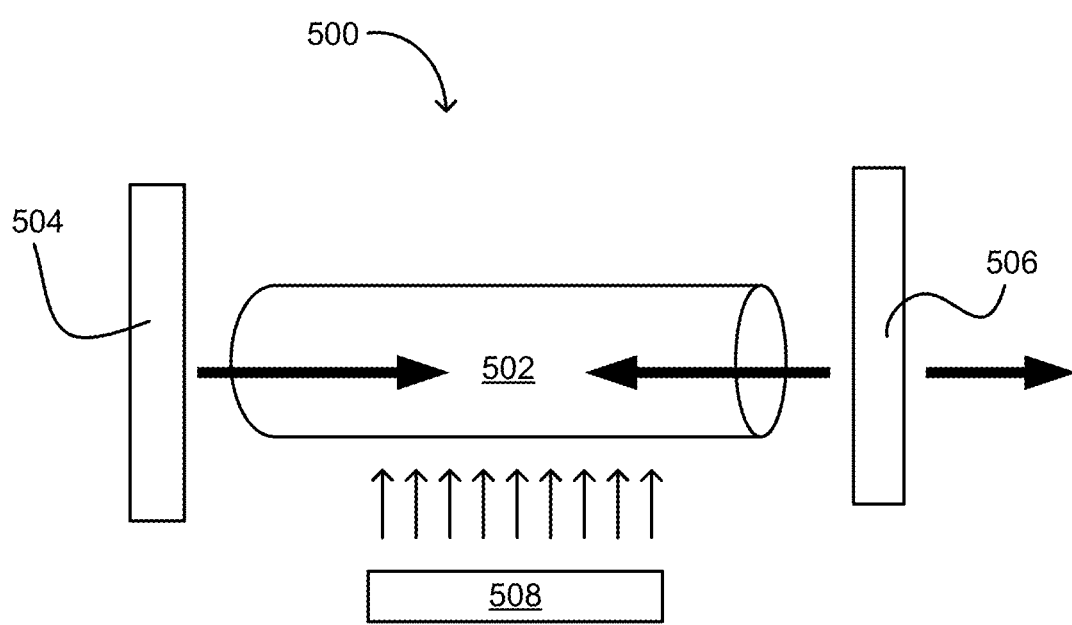
FIG. 5 is a simplified schematic of a transparent ceramic optic in use as an oscillator, e.g. a laser oscillator, being pumped by a diode.
Figure 6A:
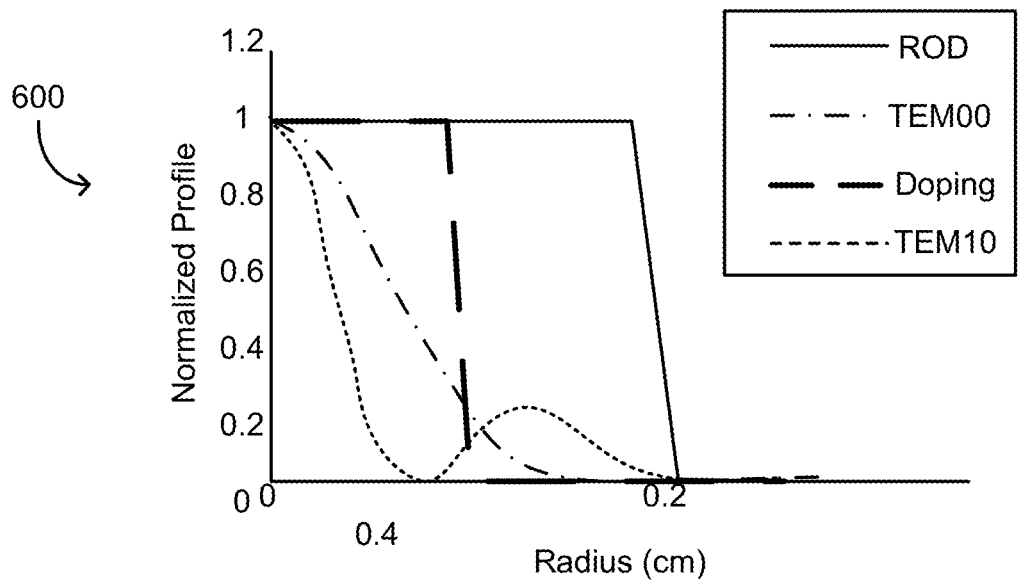
FIG. 6A is a plot showing a doping profile of a transparent ceramic optic such as shown in FIGS. 1A and 5, and corresponding laser light profiles of a preferred $TEM_{00}$ mode and undesirable $TEM_{10}$ mode.
Figure 6B:
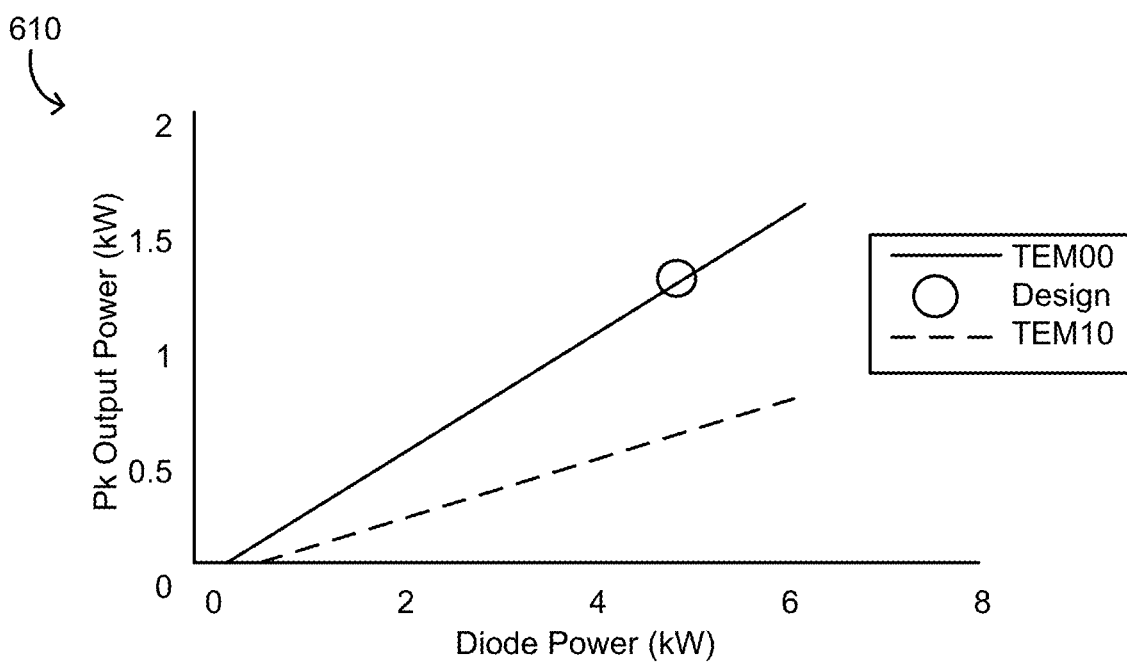
FIG. 6B is a plot depicting energetics of the $TEM_{00}$ and $TEM_{10}$ modes, demonstrating mode selectivity of a transparent ceramic optics as described herein for the desirable TEM$_{00}$ mode due to greater gain thereof.

FIG. 5 shows an example of a laser oscillator apparatus 500, comprised of two aligned mirrors 504, 506 for generation of a laser in response to stimulation of a laser gain medium 502 by a suitable source 508 such as a laser diode or flashlamp. FIG. 6A represents a profile 600 of a laser rod, where the lasing region is surrounded by transparent region that offers no gain and is transparent to the laser light, also including the laser light profiles of the preferred $TEM_{00}$ mode and the undesirable $TEM_{10}$ mode. FIG. 6B is a plot 610 representing energetics calculations indicating that the $TEM_{00}$ mode has greater gain that the $TEM_{10}$ mode, thereby selecting against $TEM_{10}$ lasing in the oscillator.

For example, in one approach the lasing region of the laser rod may be doped with one or more suitable lasing species dopant(s), e.g. one or more trivalent (3+) rare earth ions such as: Pr, Nd, Sm, Eu, Tb, Dy, Ho, Er, Tm, and Yb and/or transition metals such as: Ti, V, Cr, Fe, and Ni. The concentric transparent region around the center region may be undoped with any lasing species dopants, and preferably the transparent region is transparent to the laser light generated by the lasing species. In this case, the laser rod can provide "mode selectivity" as also shown in FIG. 6B, where the fundamental mode referred to as $TEM_{00}$ and having a Gaussian profile has more overlap with the gain (i.e. lasing) region than the (less desirable) next higher order mode $TEM_{10}$, so that the laser in the lowest order mode is preferentially selected in a laser oscillator employing this type of gain medium. Mode selectivity that favors $TEM_{00}$ relaxes the requirements on the rest of the optics in the laser, and thus facilitates low-cost and low-complexity laser engineering, and enhances the efficiency of the laser since the energy stored in the rod is more fully extracted than in media favoring the TEM 10 mode, or less strongly favoring the $TEM_{00}$ mode.

A further benefit of the presently disclosed inventive techniques is to provide a precisely graded laser ion doping in the laser rod such that extraction efficiency improves dramatically. In particular, if the doping profile conveyed by the DIW fabrication process is precisely controlled to form a graded doping profile of lasing species dopant concentration, e.g. following a Gaussian distribution with its peak lasing species dopant concentration at the core and reducing to zero lasing species dopant concentration at the surface(s) of the rod, the doping profile may advantageously nearly match the desired $TEM_{00}$ laser mode profile, as discussed above.

The presently disclosed inventive concepts are especially valuable for creating more complex and smaller structures, which cannot be achieved via conventional pouring and assembling techniques, as well as for allowing the graded mixing of inks as a continuous function across the aperture of the gain element. As mentioned above, available fabrication methods rely on pouring slurries into molds with millimeter spatial scale, while the DIW method enables the fabrication that can have features as small as 25 microns without molds, by programming the desired three-dimensional structure into a computer controlling the DIW instrument, ink flow, and mixing parameters. These structures can be more complex and have smaller feature size, allowing precise control and thus the advantageous improvements to extraction efficiency and matching of the doping profile and laser mode.

Moreover, by mixing two or more inks together prior to writing one or more portions of the part, it is possible to have continuous and highly controllable gradients in the composition, oriented in nearly any desired configuration (e.g. radial gradients, longitudinal gradients, latitudinal gradients, and mixtures thereof). The mixing and its control advantageously enables spatially-graded gain and/or refractive index profiles, the benefits of which will be discussed in further detail below.

Optical Distortion

Differences in refractive index between regions of a laser rod undesirably introduce optical distortion, e.g. in the form of wave front distortion. As such, conventional fabrication techniques which lack the precise control afforded by DIW result in optics that, even when possessing different regions of varied composition and/or structure, undesirably generate optical distortion.

One example of a composite laser rod is represented in FIG. 2 along with an interferogram measuring the number of "waves of distortion" or fringes generated by the laser rod (inset). In accordance with FIG. 2, the lasing portion of the laser rod is in the central region, and is positioned at an angle with respect to the longitudinal axis of the laser rod. As a result, when placed in the interferometer differences in refractive index between the two regions can be observed as the transition region exhibits the relatively high frequency fringing compared to the central lasing region and surrounding transparent region, respectively. A readout of the interferometry data in the pictures is shown, where a model of the fringes is plotted (dashed curve) along with the actual data (solid curve).

With continuing reference to FIG. 2, the fringes mainly arise from the difference in refractive index of the doped central region and undoped outer region. In this example, the host medium material is the garnet $(Gd, Y)_3(Sc,Al)_5O_{12}$, and dopant is 1% Nd, the most common laser ion. From the data and analysis the inventors conclude that the 1% presence of Nd lasing species causes the refractive index to rise by about 0.00032. This level of optical distortion is normally unacceptable in a laser medium. For the host medium being Yttrium Aluminum Garnet, YAG, the most common laser material, with the formula $Y_3Al_5O_{12}$, the addition of 1% Nd as a lasing species dopant raises the refractive index slightly more, by about 0.0005. Accordingly, controlling the doping profile is essential to produce efficient laser gain media so as to avoid or minimize optical distortion. This is especially true as the level of lasing species doping increases, e.g. as may be desirable to generate additional gain via the laser medium, since addition of Nd causes the refractive index of the doped region to further deviate from the refractive index of the undoped region, exacerbating optical distortion effects.

For a refractive index change with approximately a parabolic shape across an optic, such distortion will undesirably generate a lensing effect. For a parabolic profile, the focal power f of the optic scales as: $f^1=2\Delta nL/r^2$, where r is the characteristic radius of an assumed parabolic profile of the refractive index, $\Delta n$ is the refractive index change, and L is the length of the optic (such as a laser rod). Accordingly, the index radius r is expected to be about ½ of the radius of the optic. In order to mitigate the strength of the focal power generated by the index profile by increasing the value of r, it is useful to place a restriction on the size of $\Delta n$. As suggested above, DIW provides a unique capability to restrict $\Delta n$ by precisely controlling the composition of the optic.

This design consideration is particularly useful, because it may be difficult to exactly match the refractive indexes of the lasing and transparent regions, i.e. $\Delta n$ cannot be exactly equal to zero. For example, if we specify that f>2L, such that the index-induced focal length must be at least twice the length of the laser rod, then the expression $\Delta n < r^2/(4L^2)$ must be satisfied. For example, for a system in which r=0.1 cm and L=10 cm, a $\Delta n < 2.5 \times 10^{-5}$ is necessary to avoid undesirable lensing and distortion.

Since 2% Nd doping in the, e.g. central or lasing region, of the rod changes the index by ~$1.0 \times 10^{-3}$ for 2 atomic percent (2 at. %) in a host medium comprising $Y_3Al_5O_{12}$ (YAG), the ability to control the composition of adjacent, e.g. outer or transparent, regions and match the refractive indices of the various regions would be highly advantageous. However, such control and matching is not achievable using conventional laser rod fabrication techniques.

DIW allows precise mixing of an ion that raises the refractive index into the ink used for the transparent region of the laser rod, thus facilitating matching the refractive index of the lasing region. In one approach, this matching may be accomplished by doping the transparent region with another dopant species, e.g. an ion such as Lutetium to raise refractive index to be near that of the lasing region. Preferably, the ion employed for this purpose does not impair transparency of the transparent region to the laser beam. In one approach, where the laser rod comprises a Nd-doped lasing region surrounded by a transparent YAG annulus, a ratio of about five Lu ions for each Nd ion are sufficient to match the index.

If the refractive index profile is abrupt, meaning that it changes significantly over a distance short compared to the radius of the doping profile, then the criterion is somewhat more stringent. For instance, in such cases the laser rod can tolerate no more than about ½ wave of distortion, with the wave being the wave of the laser light. This requirement may be expressed as $\Delta n \, L < \lambda/2$, which translates to a $\Delta n < 0.5 \times 10^{-5}$ for a 10 cm gain element and a $\Delta n < 0.5 \times 10^{-4}$ for a rod having L=1 cm, and at a wavelength of $\lambda=1$ mm. The presently disclosed inventive concepts, particularly via the use of multiple inks, precise mixing thereof, and precise positioning of desired compositions throughout the green body and thus final optic via DIW enables control of the desired wavefront distortion to less than one wave of distortion.

Saturable Absorption and Q-Switching

The inventive methods disclosed herein for writing different functional regions in the gain medium can offer additional advantages beyond the method of mode control that was mentioned above. For example, portions of a gain element such as Nd-doped YAG can be partly comprised of $Cr^{4+}$:YAG and/or $Sm^{3+}$:YAG, both of which absorb light at the lasing wavelength of the Nd dopant. As such, the additional dopants can serve as means of controlling laser action in unwanted directions in the gain element. Moreover, if the Cr:YAG section is arranged to be directly in the path of the laser beam, it can serve the function of a so-called saturable absorber—an optical material which at first is absorptive to the laser beam but then afterwards is pumped to an excited state to a significant degree (e.g. where more than about 50% of the Cr ions are pumped to the excited state).

This excitation produces a strong pulse of laser light having pulse widths of about 1-1000 nsec, via a process known as Q-switching. Alternative host media besides YAG can be utilized in the present invention, such $Lu_3Al_5O_{12}$, $Y_2O_3$, and other laser host materials having a cubic structure that would be appreciated by a skilled artisan upon reading the present disclosures.

Since pump light is absorbed by the $Cr^{4+}$ ions in YAG ions to some extent, it is often desirable to arrange the Cr:YAG section to be out of the way of the pump light to avert detrimental absorption which adds to the amount of heat generated in the laser rod and increases the amount of thermal lensing, which is undesirable as noted in further detail below.

In some laser designs it is useful to emplace numerous sections of Cr:YAG along the laser rod, alternating with regions of Nd:YAG (see FIG. 1D). This type of arrangement is better able to suppress any spontaneous gain in the Nd:YAG sections which can provide a laser pulse after the threshold for Q-switching is reached and when a sufficient amount of Nd ions are pumped the excited state, or by extracting the gain with an externally provided laser pulse of sufficient intensity. By separating the Cr and Nd ions into different regions, the adverse impact of Nd→Cr energy transfer is averted.

Thermal Lensing

The use of DIW for fabrication of laser rods offers many possibilities for tailoring the structure. For example, when a laser rod is pumped a non-negligible fraction of pump power is converted to heat. As the heat is normally removed from the side of the laser rod, the interior of the rod is hotter than the side and a so-called thermal lens is generated, leading to an undesirable lensing effect (since the refractive index changes with temperature). With DIW and the proper selection of particles having different compositions, it is possible to build in a refractive index profile that is essentially opposite to the thermally-induced index profile so as to essentially negate the adverse impact of thermal lensing.

In another use of DIW for fabricating laser rods with improved performance, it is possible arrange for two different compatible host crystal structures to be juxtaposed, for example by having the central lasing region comprised of $Er_3Al_5O_{12}$ and the surrounding transparent region to be undoped $Y_3Al_5O_{12}$ (YAG), see FIGS. 1A and 1C. The gain element would favorably lase near 3 μm, since the $Er_3Al_5O_{12}$ type of laser operates more efficiently at very high Erbium concentration, and with this design the laser rod diameter can be of a reasonable diameter while also allowing the incorporation of a region with very high erbium concentration.

In still more approaches, parasitic oscillations may be suppressed via application of a cladding such as Sm:YAG, a copper-doped host, or other suitable cladding material for the particular lasing characteristics of the optic as would be appreciated by a person having ordinary skill in the art upon reading the instant descriptions. Again, DIW advantageously allows the precise positioning and compositional control over the cladding and thus offers an improvement over conventional fabrication techniques and resulting optical structures.

It should be noted that any of the presently described materials and techniques for use and/or manufacture thereof may be utilized in any combination or permutation. While certain techniques have been set forth under headings and with reference to particular applications, one having ordinary skill in the art reading the present disclosure would appreciate that each technique, and even the sub-techniques thereof, could be utilized broadly in any suitable application. Accordingly, the foregoing descriptions are not to be considered limiting on the manner of manufacturing or using the multifunctional reactive inks described herein.

Accordingly, in one embodiment, a composition of matter includes a plurality of particles in a thixotropic suspension to form an ink. The plurality of particles are present in an amount of at least about 20 vol %, preferably an amount in a range from about 20 vol % to about 70 vol %, more preferably an amount in a range from about 40-60 vol %, and most preferably about 35-50 vol % of the ink composition. The particles include at least two constituents from among: (1) a first host medium material containing one or more lasing species dopants, one or more other dopant species, or both; (2) an undoped host medium material; and (3) a second host medium material that includes at least one other dopant species, e.g. a dopant species for conveying saturable absorption, magnetic properties, and/or tuning a refractive index profile of the optic to be formed from the ink precursor. The ink also includes a liquid phase, present in an amount greater than about 20 vol % and less than about 80 vol %. The liquid phase includes at least one of: surfactant(s); binder(s) and solvent(s) (preferably polar organic solvents). The surfactant(s) may be present in an amount in a range from about 0 vol % to about 40 vol %, preferably about 10-20 vol %, and may include any combination of one or more organic acid surfactants, such as ammonium polymethacrylate, methacrylic acid and/or derivatives thereof, MEEAA (2-[2-(2-methoxyethoxy) ethoxy] acetic acid, methoxyacetic acid, ethoxyacetic acid, butoxyethoxyacetic acid, methoxypropionic acid, butoxyacetic acid and/or other suitable clean-burning surfactants of the type that would be appreciated by a skilled artisan upon reading the present descriptions, e.g. DARVAN® C-N. The binder(s) is/are present in an amount ranging from greater than about 0 vol % to about 60 vol %, preferably about 5-30 vol % of the ink composition, and include one or more of the following exemplary binders, and/or equivalents thereof, in any combination: polyethylene glycol (PEG) or a glyme thereof; polypropylene glycol (PPG) or a glyme thereof; methacrylic acid or a derivative thereof; and polymerizable glycol(s). The solvent(s), the solvent(s) preferably is/are present in an amount ranging from greater than about 10 vol % to about 70 vol %, preferably about 20-40 vol % of the ink composition, and may include any combination of: propylene carbonate, di-methoxyethanol, tri-methoxyethanol, tetra-methoxyethanol, water, one or more alcohols, one or more cyclic carbonates such as propylene carbonate, one or more ethylene oxide-based glymes (also referred to as PEG-based glymes), one or more propylene oxide-based glymes, and one or more propylene glycol-based glymes (also referred-to as polypropylene-based glymes or PPG-based glymes). The first and/or second host medium materials may include two or more constituents selected from Y, Gd, La, Ce, Lu, Sc, Ga, Al and O, and preferably form a polycrystalline crystal structure such as a garnet structure. For instance, the host medium materials may be characterized, by a formula substantially conforming to $Y_3Al_5O_{12}$. The first host medium material may incorporate lasing species dopant(s) and/or other dopant species, while the second host medium material preferably incorporates at least one other dopant species. An undoped host medium material may also be included in the particles of the ink composition. The lasing dopants may include one or more rare earth ion dopants, and/or one or more transition metal dopants, in any suitable combination. For instance, lasing dopant species may include one or more trivalent rare earth ion(s) such as: Pr, Nd, Sm, Eu, Tb, Dy, Ho, Er, Tm, and/or Yb, additionally or alternatively with one or more transition metals, such as Ti, Co, V, Cr, Fe and/or Ni. Moreover, the "other" dopant species may include any combination of Lu, La, Ce, Sc and/or Ga.

Turning now to exemplary transparent optics as described herein, in various approaches the optics may include a lasing region comprising at least one lasing species dopant; and a transparent region transparent to light generated by the lasing species. At least the transparent region is doped with at least one other dopant species such that the lasing region and the transparent region are characterized by a difference in refractive index between the two regions in an amount of about $1.0 \times 10^{-4}$ or less. The at least one lasing species dopant may exhibit a concentration gradient along a radial axis of the optic; where the concentration of the at least one lasing species dopant reaches a maximum concentration at approximately a midline along an axis of light propagation of the optic, along the longitudinal axis thereof (e.g. in the center of lasing region 102 of FIGS. 1A-1C). Of course, the radial concentration gradient may additionally or alternatively exist with respect to a ratio of chosen lasing dopant species or combinations thereof, and/or other dopant species or combinations thereof. The lasing region may optionally include a plurality of discrete transverse sections each respectively comprising either: different ones of at least one lasing species dopant; different amounts of the at least one lasing species dopant; or both. A radial, longitudinal, or other concentration gradient may exist with respect to each of the different dopant species between some or all of the discrete transverse sections. Accordingly, the lasing region may be characterized by a longitudinal concentration gradient of the at least one lasing species. Similarly, at least one other dopant species may exhibit a radial concentration gradient within at least the transparent region of the optic. In such cases, the radial concentration gradient preferably extends for a length of at least about ¼ to ½ of a radius of the optic. The optic preferably exhibits a polycrystalline, cubic phase crystal structure, more preferably a garnet structure incorporating the at least one lasing species and the at least one other dopant species. As noted above regarding the ink formulations, the lasing dopants may include one or more rare earth ion dopants, and/or one or more transition metal dopants, in any suitable combination. For instance, lasing dopant species may include one or more trivalent rare earth ion(s) such as: Pr, Nd, Sm, Eu, Tb, Dy, Ho, Er, Tm, and/or Yb, additionally or alternatively with one or more transition metals, such as Ti, Co, V, Cr, Fe and/or Ni. Moreover, the "other" dopant species may include any combination of Lu, La, Ce, Sc and/or Ga. The host medium material(s) may include two or more constituents selected from Y, Gd, La, Ce, Lu, Sc, Ga, Al and O, while the at least one other dopant species includes: Lu, La, Ce, Sc and/or Ga, singly or in any suitable combination. Where the at least one lasing species dopant is Nd; the at least one other dopant species is preferably Lu; and more preferably the Nd and the Lu are present in a ratio of approximately 1:5 (Nd:Lu). The optic may optionally include a cladding arranged around at least portions of an exterior surface of the optic, such as Sm:YAG or a copper cladding. In particularly preferred approaches, the optic is structurally arranged as an elongated cylinder; and the elongated cylinder comprises the lasing region and the transparent region arranged as concentric cylinders, the transparent region substantially surrounding the lasing region.

In another aspect, a method of forming a transparent ceramic optic includes depositing a plurality of layers of at least one optic precursor ink to form a monolith using a technique selected from: direct ink writing (DIW) and extrusion freeform fabrication and performing at least one ceramic processing technique to process the monolith to transparency. The deposition process may involve defining one or more concentration gradients via the plurality of layers of the at least one optic precursor ink, where the one or more concentration gradients include: a radial concentration gradient with respect to at least one lasing species of the at least one optic precursor ink; a longitudinal concentration gradient with respect to at least one lasing species of the at least one optic precursor ink; a radial concentration gradient with respect to at least one dopant species of the at least one optic precursor ink, or any combination thereof. As such, the depositing operation may include depositing a plurality of different optic precursor inks, each optic precursor ink comprising a different lasing species, a different dopant species, or both. At least some of the plurality of layers may include a first of the different optic precursor inks, and at least some other of the plurality of layers may include a second of the different optic precursor inks; while still other of the plurality of layers may comprise at least a first and a second of the different optic precursor inks. In a particularly preferred approach, useful for Q-switching especially, the optic may include layers having a Nd lasing dopant and other layers having a Cr dopant incorporated therein, most preferably forming alternating transverse sections of Nd-doped and Cr-doped material. The fabrication methods and inks used therewith may, of course, have any composition within the parameters set forth hereinabove, such that each optic precursor ink may independently comprise: a plurality of particles in a thixotropic suspension to form an ink. The plurality of particles are present in an amount of at least about 20 vol %, preferably an amount in a range from about 20 vol % to about 70 vol %, more preferably an amount in a range from about 40-60 vol %, and most preferably about 35-50 vol % of the ink composition. The particles include at least two constituents from among: (1) a first host medium material containing one or more lasing species dopants, one or more other dopant species, or both; (2) an undoped host medium material; and (3) a second host medium material that includes at least one other dopant species, e.g. a dopant species for conveying saturable absorption, magnetic properties, and/or tuning a refractive index profile of the optic to be formed from the ink precursor. The ink also includes a liquid phase, present in an amount greater than about 20 vol % and less than about 80 vol %. The liquid phase includes at least one of: surfactant(s); binder(s) and solvent(s) (preferably polar organic solvents). The ceramic processing techniques may include any combination of cold isostatic pressing (CIP) the monolith; calcining the CIP'ed monolith; sintering the calcined monolith; and/or hot isostatic pressing (HIP) the sintered monolith. The CIP procedure may involve applying uniform pressure to the monolith in an amount from about 5,000-60,000 psi at a temperature less than about 500 C; while the calcining process may involve heating the CIP'ed monolith to a temperature greater than or about 250 C in an atmosphere of air or oxygen. The sintering may involve any single process or combination of processes selected from: vacuum sintering at a temperature in a range from about 1,000 C to about 1,900 C; controlled atmosphere sintering at a temperature in a range from about 1,000 C to about 1,900 C; helium sintering at a temperature in a range from about 1,000 C to about 1,900 C; and oxygen sintering at a temperature in a range from about 1,000 C to about 1,900 C. The HIP procedure may include simultaneously applying a pressure to, and heating, the sintered monolith; where the pressure is in a range from about 10,000 psi to about 60,000 psi; and heating the sintered monolith is performed to a temperature in a range from about 1,000 C to about 2,000 C.

While various approaches and implementations of the presently disclosed inventive concepts have been described above, it should be understood that they have been presented by way of example only, and not limitation. Thus, the breadth and scope of an approach of the present invention should not be limited by any of the above-described exemplary approaches, but should be defined only in accordance with the following claims and their equivalents.

What is claimed is:

1. A transparent ceramic optic, comprising:
    a lasing region comprising at least one lasing species dopant; and
    a transparent region transparent to light generated by the lasing species; and
    wherein at least the transparent region is doped with at least one other dopant species such that the lasing region and the transparent region are characterized by a difference in refractive index between the two regions in an amount of about $1.0 \times 10^{-4}$ or less.

2. The optic as recited in claim 1, wherein the at least one lasing species dopant exhibits a concentration gradient along a radial axis of the optic; and
    wherein a concentration of the at least one lasing species dopant reaches a maximum concentration at approximately a midline along an axis of light propagation of the optic, along a longitudinal axis thereof.

3. The optic as recited in claim 1, wherein the lasing region comprises a plurality of discrete transverse sections each respectively comprising either:
    different ones of the at least one lasing species dopant;
    different amounts of the at least one lasing species dopant; or
    both.

4. The optic as recited in claim 1, wherein the lasing region is characterized by a longitudinal concentration gradient of the at least one lasing species.

5. The optic as recited in claim 1, wherein the at least one other dopant species exhibits a radial concentration gradient within at least the transparent region.

6. The optic as recited in claim 1, herein the at least one other dopant species comprises one or more elements selected from the group consisting of: Lu, La, Ce, Sc and Ga.

7. The optic as recited in claim 1, wherein the optic is characterized by a polycrystalline structure.

8. The optic as recited in claim 1, wherein the optic is characterized by a cubic phase crystal structure.

9. The optic as recited in claim 1, wherein the transparent region comprises at least one host medium material; and wherein the at least one host medium material comprises two or more constituents selected from the group consisting of: Y, Gd, La, Ce, Lu, Sc, Ga, Al, and O.

10. The optic as recited in claim 1, wherein the optic is structurally arranged as an elongated cylinder; wherein the elongated cylinder comprises the lasing region and the transparent region arranged as concentric cylinders; and wherein the transparent region substantially surrounds the lasing region.

11. The optic as recited in claim 1, wherein the at least one other dopant species is characterized by a radial concentration gradient within at least the transparent region of the optic.

12. The optic as recited in claim 11, wherein the radial concentration gradient extends for a length in a range from about 25% to about 50% of a radius of the optic.

13. The optic as recited in claim 1, comprising a cladding arranged around at least portions of an exterior surface of the optic.

14. The optic as recited in claim 13, wherein the cladding comprises Sm:YAG or copper.

15. The optic as recited in claim 1, wherein the at least one lasing species dopant comprises one or more material(s) selected from the group consisting of: trivalent rare earth ion(s) and transition metal(s).

16. The optic as recited in claim 15, wherein the trivalent rare earth ion(s) comprise(s) one or more elements selected from the group consisting of: Pr, Nd, Sm, Eu, Tb, Dy, Ho, Er, Tm, and Yb.

17. The optic as recited in claim 15, wherein the transition metal(s) comprise(s) one or more elements selected from the group consisting of: Ti, Co, V, Cr, Fe and Ni.

18. The optic as recited in claim 1, wherein the optic is characterized by a garnet structure.

19. The optic as recited in claim 18, wherein some or all of the at least one lasing species dopant is incorporated into the garnet structure.

20. The optic as recited in claim 18, wherein some or all of the at least one other dopant species is incorporated into the garnet structure.

\* \* \* \* \*